INVENTOR.
Siegfried Böhm
BY Friedrich Winkler
Heinrich Skolaude

INVENTOR.
Siegfried Böhm
BY Friedrich Winkler
Heinrich Skolaude

INVENTOR.
Siegfried Böhm
Friedrich Winkler
BY
Heinrich Skolaude

United States Patent Office 3,052,170
Patented Sept. 4, 1962

3,052,170
REFLEX CAMERA WITH DIAPHRAGM CONTROL
Siegfried Böhm, Dresden, Friedrich Winkler, Munich, and Heinrich Skolaude, Freital, Germany, assignors to VEB Kamera- und Kinowerke Dresden
Filed Nov. 8, 1957, Ser. No. 695,409
Claims priority, application Germany Dec. 14, 1956
8 Claims. (Cl. 95—42)

This invention relates to a reflex camera with diaphragm control.

In reflex cameras of the monocular type the image is thrown by the objective lens on the emulsion carrier and can also be viewed on the ground glass above or on the image field lens with the aid of a mirror moved into the path of the rays, the object to be taken appearing then side-inverted. In the course of further development of reflex cameras, additional view finder systems have been provided which permit, owing to the use of prisms and other optical means, observation of the object to be taken without vertical or lateral inversion. All such reflex and finder systems, however, are open to the objection that the diaphragm arranged in the lens reduces the intensity of the finder image if set to smaller apertures than that of the objective lens. The result impairs the brightness of the finder image.

In order to avoid this disadvantage, lenses have been developed which make possible the presetting of the diaphragm. The characteristic feature of these lenses is that the diaphragm, when in its initial position, allows the full lens aperture to be effective and adjusts itself to the preselected setting only after it has been released. In this way the intensity of the finder image remains unaffected prior to exposure irrespective of the diaphragm setting.

The following systems of similar lenses have been developed:

(1) Objective lenses with semi-automatic operation of a preselector diaphragm.

When this type of lens is used, the diaphragm is urged into its closed position by spring action and must therefore be moved by a tension member, prior to any exposure, against the action of the closing spring into the initial position where it fully opens the lens aperture. In this position the diaphragm is held by locking means connected with a release member, by the actuation of which the locking means is released and the diaphragm is urged into the preselected position due to the action of the closing spring. This lens design, therefore, requires manually setting back the diaphragm to the initial position prior to any exposure and thereby simultaneously tensioning it.

(2) Objective lenses with fully automatic operation of the preselector diaphragm. Two systems have been developed so far, as follows:

(a) In one system, the diaphragm is urged into the initial position by spring action, where it fully opens the lens aperture. The movement out of this position and to the preselected setting is performed by actuation of a plunger which cooperates with the diaphragm mechanism and when actuated causes the diaphragm first to move against the action of its spring and to pass to the preselected setting, and then to return to the initial position during the return motion of the plunger, due to the action of the spring.

(b) According to the other system, the diaphragm is moved into the closing position by spring action and thus into the preselected setting. The diaphragm is again controlled by a plunger cooperating with the diaphragm mechanism so that when the plunger is actuated, the diaphragm is moved to the preselected setting by the action of the closing spring. During the return of the plunger against the force of the diaphragm closing spring, the diaphragm is brought back into the initial position where it opens the lens aperture.

It is the object of the present invention to provide a simple arrangement for reflex cameras having lenses with preselector diaphragms whereby to obtain reliable control of the diaphragm in connection with the releasing means of the camera. The diaphragm control mechanism is so constructed as to be applicable to both built-in and to interchangeable lenses having screw or bayonet mounts. The means for controlling the diaphragm can be adapted to the various designs, to the direction of motion and to the stroke lift of the diaphragm releasing member.

The invention also provides means for permitting direct release and control of the diaphragm by the releasing device of the camera and for preventing return of the diaphragm from its adjusted to its initial position at an accidentally premature return motion of the release member. For this purpose, locking means are provided which cooperate with the releasing device and with the shutter drive in such manner that the diaphragm, having moved towards the adjusted setting after the release, is held in this position by the locking means until the latter are released by the shutter at the end of its run. In this way the diaphragm remains in the position of the preselected setting at all exposure times after it has been released, even if the release member of the camera has been prematurely set in the meantime.

In another embodiment of the invention, the release and control of the diaphragm are not directly effected by the release member of the camera but by a locking member which is influenced thereby and controls the diaphragm by way of an intermediate member. This construction affords the advantage of a reduced release pressure, since it is not necessary to actuate the control members of the diaphragm but only the locking member. It is further possible to return the diaphragm to the initial position simultaneously with winding by way of the shutter gear.

Other features of the invention will be explained in the following description of the various designs.

The accompanying drawings refer to embodiments of the invention applied to a schematically shown monocular reflex camera. The camera body is partly broken away for better understanding of the invention, and details not needed for this purpose have been omitted.

In the drawings:

FIGS. 3–6 are sectional side views taken in the direction of the left side of FIG. 1, of which FIGS. 3 and 4 are views of an arrangement suitable for lenses with a semi-automatic or automatic preselector diaphragm according to the respective designs previously described under (1) and (2a);

FIG. 5 shows similar details of an arrangement having a lens with a fully automatic preselector diaphragm according to design (2b);

FIG. 6 shows details similar to FIG. 5 but arranged for delayed action released in a sectional view taken in a different plane from FIGS. 3–5;

Figure 2:
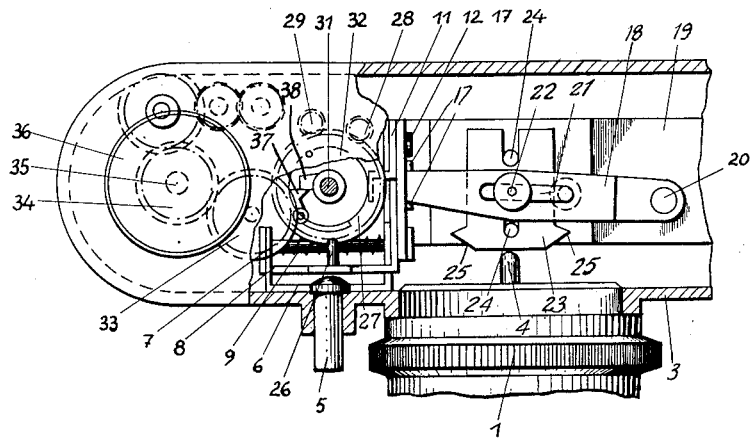
FIG. 2 is a partly sectional view of the camera shown in FIG. 1.
Figure 5:
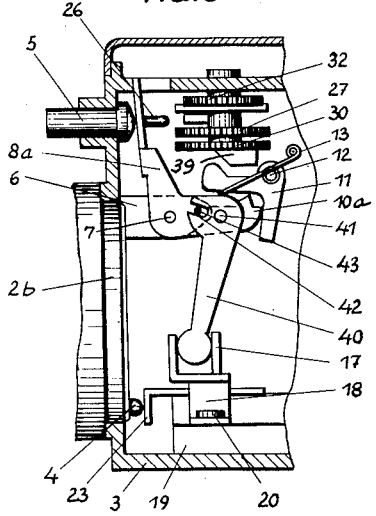
Figure 6:
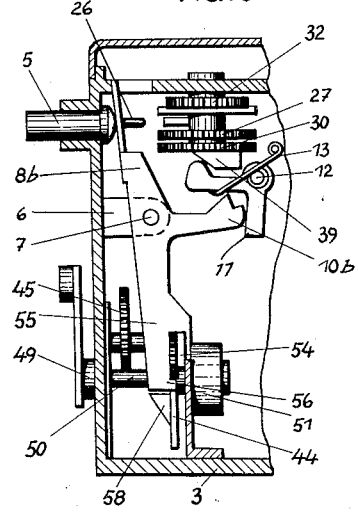
Figure 7:
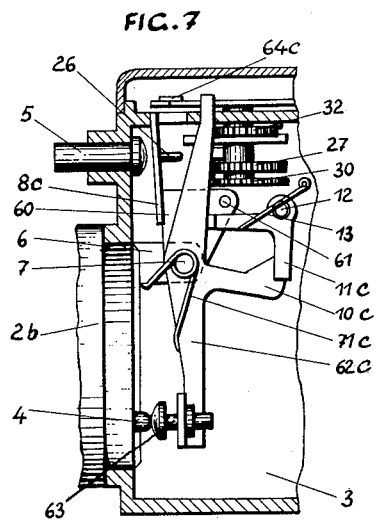
Figure 8:
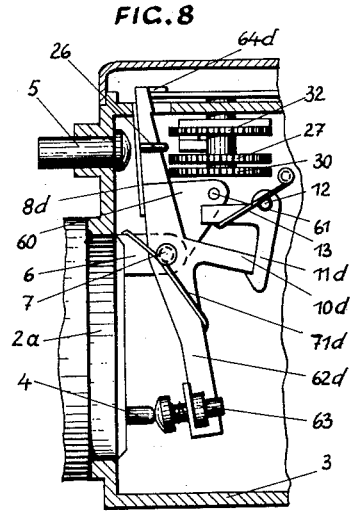
Figure 9:
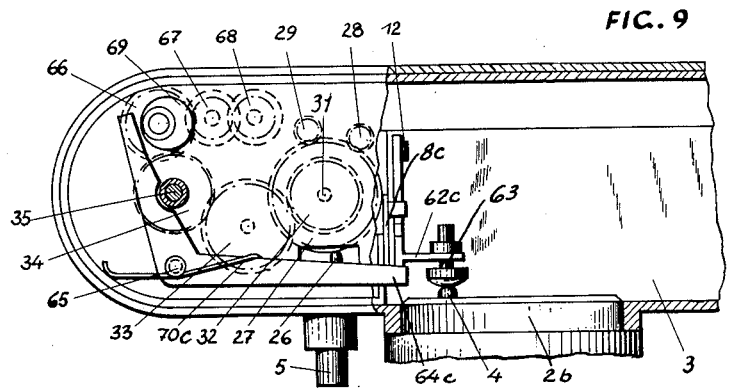
Figure 10:
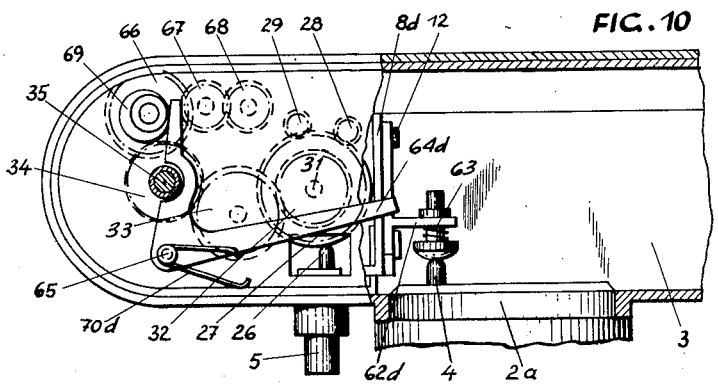

FIGS. 7 and 9 are, respectively, a side view similar to those of FIGS. 3–6 and a top view similar to FIG. 2 of another arrangement where a lens with an automatic preselector type diaphragm is used, as previously described under (2b), and the latter is positively returned to the initial position by the shutter gear; and FIGS. 8 and 10 show views similar to FIGS. 7 and 9, respectively, of an arrangement where a lens with an automatic preselector type diaphragm is used, as previously described under (2a), and the latter is positively returned to the initial position by the shutter gear.

Figure 1:
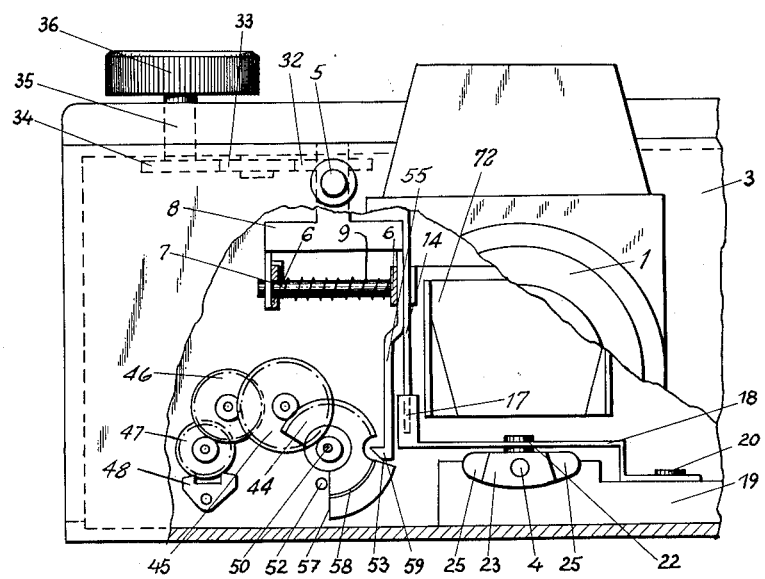
FIG. 1 is a partly sectional partial front view of a camera having a semi-automatic preselector diaphragm of the type described under (1) hereinabove.

In all figures the lenses are designated 1, 2a, 2b in conformity with the designs (1), (2a) and (2b) previously described. The lenses are secured by means of a screw or bayonet-type mount to the camera or the camera body 3, not shown in detail. For all lenses having (not shown) preselector diaphragms, the releasing and control of the latter is effected by a plunger 4 reciprocating in its axial direction and projecting from the rear side of the objective assembly into the camera body. A reflex mechanism is shown in FIG. 1 at 72. As shown in FIGS. 1 to 6, the plunger 4 and thereby the control of the diaphragm are directly actuated by a release member 5 of the camera, which also releases the shutter. In the embodiment according to FIGS. 1 and 4, this takes place as follows: Below the release member 5 a double armed control lever 8 is movably disposed in bearing flaps 6 about a pivot 7 and is urged by a spring 9 against the release member 5 which is provided with a stop collar. The lever 8 has a bent arm 10 whose end formed as a stop nose cooperates with a locking member 11 arranged around a pivot 12 and pressed into its locking position by a spring 13. Coaxially with the lever 8 another lever 14 is movably disposed on the pivot 7, which embraces with its strap 15 the lever 8 and is constantly pressed against it by a spring 16. The lever 14 engages with its other, spherical end a fork 17 of a lever 18 movably disposed on a support 19 about a pivot 20. The lever 18 has a longitudinal slot 21 through which an adjustable pin 22 passes, by means of which the lever 18 is connected with a slide 23 arranged underneath which is guided by a pin 24 on the support 19 in longitudinal direction or in that of the lens axis. On the end opposite the lens the slide 23 has slopes 25 which serve as gliding surfaces for the plunger 4 when the lens is screwed in or exchanged.

A pin 26 is secured to the lever 8 for releasing the shutter which is in all embodiments of the focal plane type and effects exposure in a known manner by means of two curtains passing the gate. A shutter driving gear 27 actuates the roller of the first or light-admitting curtain by a pinion 28, and the second curtain which covers the opening again is driven by a driving gear 30 by way of a pinion 29 connected with the curtain roller. Above the driving gear 27 a gear wheel 32 is loosely and coaxially arranged on a fixed shaft 31 and in connection with an intermediate gear 33. A gear wheel 34 effects the winding of the shutter by means of a knob 36 firmly connected with gear wheel 34 by a shaft 35. For this purpose the gear wheel 32 has a spring-controlled pawl 37 secured to it which cooperates with a cam 38 firmly connected to the shutter driving gear 27 (FIG. 2). When the shutter is tensioned by means of the winding knob 36, the pawl 37 is driven by way of the gear wheels 34, 33, 32 and in the course of this rotary motion strikes against the cam 38 and thereby actuates the winding gear of the shutter. At the end of this motion the pawl 37 occupies the position shown in FIG. 2. During release the pin 26 of lever 8 strikes against the elongated arm of pawl 37 which is thus swung out and permits running off of the driving gear. The shutter gear 30 is provided with a cam 39 which is so arranged that, at the end of the shutter run, it acts against the locking member 11 and moves it out of its locking position.

Figure 3:
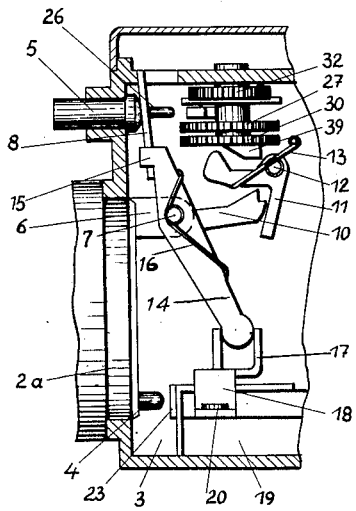
Figure 4:
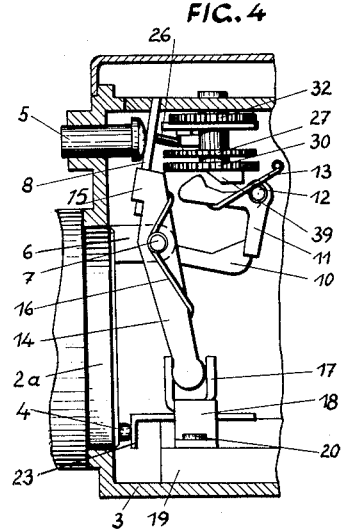

Let us assume that the shutter is tensioned and the camera ready for operation and all parts are in the positions shown in FIGS. 1 to 3. By actuation of the release member 5, the lever 8 is correspondingly turned about its pivot 7, and this movement is followed, due to the action of spring 16, by that of lever 14 also disposed on pivot 7. Lever 14 engages with its spherical lower end the fork 17 of lever 18 so that the latter and the slide 23 connected therewith are correspondingly moved towards the objective. When a lens with a semi-automatic preselector diaphragm according to design (1) is used, the slide 23 comes now into contact with the plunger 4, moves it inwards of the diaphragm casing and thereby effects the release of the diaphragm locking means, so that the diaphragm by the action of its closing spring leaves its initial open position and moves to the preselected setting. If, on the other hand, a lens with fully automatic operation according to design (2a) is employed, the slide 23 positively moves the ram plunger 4 in the course of the releasing motion inward whereby the diaphragm is simultaneously moved to the preselected setting against the action of its opening spring.

During this releasing motion the pin 26 secured to lever 8 strikes against the pawl 37 of the gear wheel 32 and moves it to an extent permitting the running-off of the shutter. In the course of the releasing movement the lever 8 with its bent arm 10 reaches the locking member 11 and is blocked thereby (FIG. 4), in consequence whereof the return movement of lever 8 is temporarily prevented even if the pressure exerted on the releaser 5 is eliminated. This blocked position is maintained for the duration of the exposure time (regardless of its duration) and is released only by the shutter itself at the end of its run when the cam 39 on driving gear 30 strikes against the locking member 11 and moves it so that the lever 8 or its bent arm 10 is set free again. Only thereafter can any of the parts, including the plunger 4, that moved during the releasing operation return to the initial position. Owing to this arrangement, the diaphragm remains in the position of the adjusted setting while the shutter runs off.

If a lens with an automatic preselector diaphragm of type (2b) is used, the control of the diaphragm is reversed. For this purpose a lever 8a, provided with a bent arm 10a, as indicated in FIG. 5, cooperates with a lever 40 disposed on a pivot 41 and having a slit or port 42 which is engaged by a pin 43 firmly connected with the lever 8a. The levers 8a and 40 perform substantially the same function as the double-armed lever 8 of the previous embodiment, only with a reversal of direction. Lever 40 engages with its spherical end the fork 17 of the lever 18. Owing to this arrangement, the lever 8a moves during the release of lever 40 and thereby also the lever 18, the slide 23 and the spring-biased plunger 4 in opposite direction from the embodiment shown in FIGS. 3–4, that is, away from the objective. The plunger 4 can therefore move outwardly from the lens and thus effect the closing of the diaphragm to the preselected setting. During the return of the release member 5, the plunger 4 is pushed again inwardly while the diaphragm simultaneously returns to the initial position where it fully opens the lens aperture. In this arrangement, too, the diaphragm remains in its adjusted setting for all exposure times.

For compensating the release stroke which may differ for the various screw-and-bayonet type lenses, the adjustable pin 22 (FIG. 2) can be displaced within the longitudinal slot 21 of lever 18 correspondingly to vary the lift. Furthermore, the lever 14, which by the action of spring 16 elastically bears against the release lever 8, acts at the same time as a yielding and buffer member by means of which differences in the release stroke and stopping can also be compensated. Finally, the pin 22 when moved up to the right-hand side of the slot 21 will be completely out of engagement with slide 23 and remains stationary during the releasing movement. This construction permits, therefore, the use of lenses with or without preselector diaphragm in one and the same arrangement.

FIGS. 1 and 6 also show the arrangement of a delayed-action release mechanism which cooperates with the release member 5 in such a way that the delayed-action mechanism is first started by the releasing movement, but it then prevents further motion until the actual release action takes place. The delayed-action mechanism is released through the cooperation of the lever 8 (FIG. 1)

with lever 14, both pivoted at 7. FIG. 1 also shows some of the elements of the delayed-action mechanism described hereunder in detail in connection with FIG. 6. The mechanism is tensioned by a hand lever 49 (not shown in FIG. 1) connected to shaft 50. The mechanism (FIG. 6) comprises a driving segment 44, a gear train 45, 46 connected therewith, and members 47, 48. Tensioning is effected by the hand lever 49 firmly connected to the driving segment 44 by the shaft 50 to which a spring-wound motor 51 is secured which causes the motion of the delayed-action release mechanism limited by a stop 52. The driving segment 44 is provided on its circumference with a segment 53 which, when the delayed-action release mechanism is tensioned, extends into a slot 54 of an elongated arm 55 of lever 8b, having an arm 10b. These elements perform functions similar to those of levers 8, 8a, and arms 10, 10a of the two previous embodiments. The slot 54 is somewhat wider than the thickness of the segment 53. The lever arm 55 is provided with a locking nose 56 which, when the delayed-action release mechanism is wound, engages from below the lower edge 57 of segment 53 and thereby prevents at first the run of the delayed-action release mechanism. The segment 53 has on its front side a cam 58 cooperating with a slope 59 provided at the end of the lever arm 55 so that the resiliently arranged arm 55 slides over the peripheral surface of the cam 58 during winding of the delayed-action mechanism, and recedes at the end of the winding operation, whereupon at the running-off of the delayed-action release mechanism the lever arm 55, due to the slope of the cam 58, is pressed aside and the release is effected by the lever 8b.

Let us assume now that the delayed-action mechanism is in the run-down position shown in FIG. 1. During its winding the segment 53 reaches a position between the slot 54 of the lever arm 55 and its nose 56, and engages the lower edge 57 of the segment 53 at the end of the winding motion, limited by the stop 52, the motor 51 being simultaneously tensioned. Although during the releasing action by member 5 the locking nose 56 frees the run of the delayed-action release, due to the resulting movement of the lever 8b and its arm 55, any further releasing action is temporarily prevented by the segment 53 extending into the slot 54 of the lever arm 55. In the meantime the cam 58 provided on segment 53 begins to move the lever arm 55 in lateral direction, and this movement, by way of the lever 8, causes both the control of the diaphragm and the release of the shutter in the manner previously described. The same operation holds true with reference to FIG. 6 where lever 8b and arm 10b replace the respective lever 8 and arm 10 of FIG. 1.

In the embodiment shown in FIGS. 7 to 10, the diaphragm control takes place as follows:

The lever actuated by the release member 5, identified in FIGS. 7, 9 by 8c and in FIGS. 8, 10 by 8d, is provided instead of a bent arm having a locking cam with an angular member 60 to which a pin 61 is secured. Coaxially with the lever 8c, 8d, a three-armed control lever is disposed about the pivot 7, this lever being designated 62c in the construction according to FIGS. 7 and 9, and 62d in FIGS. 8 and 10.

An adjustable or resiliently mounted thrust bolt 63 is secured to the lower arm of each control lever 62c, 62d, which on movement of the control lever actuates the plunger 4. Each control lever has an angular arm designated 10c in FIG. 7 and 10d in FIG. 8, which cooperates with a locking member, denoted 11c in FIG. 7 and 11d in FIG. 8, and an upper arm whose end is engaged by a cocking lever 64c in FIGURES 7 and 8 and by a lever 64d in FIGS. 8 and 10. These levers 64c, 64d are arranged about a pivot 65 and actuated by the film feed gearing which is driven by the gear wheel 34 firmly connected with the winding knob 36 and comprising gear wheels 66, 67, 68. An eccentric 69 is firmly connected with the gear wheel 66. The eccentric may also be constructed as a cam disc or an out-of-true disc. The gear ratio is chosen so that at each winding and film-feed operation the gear wheel 66 with its eccentric 69 makes a complete revolution. The cocking levers 64c and 64d are moved against the eccentric 69 by the action of a respective spring, denoted 70c in FIG. 9 and 70d in FIG. 10.

The mode of operation of this arrangement is as follows, the embodiment shown in FIGS. 7 and 9 being explained first.

Let us assume that the control lever 62c is in tensioned position (FIG. 7), so that its movement is prevented by the locking member 11c against the action of a spring 71c. Owing to the pressed-in plunger 4, the diaphragm is consequently in the initial position and fully frees the lens aperture. If release occurs now, the release member 5 will turn during its motion the lever 8c whose pin 61 hits the upper angular arm of the locking member 11c which thereby is moved out of its locking position and sets free the control lever 62a, the lower arm of which is then moved away from the lens and the diaphragm by the action of the spring 71c. The plunger 4 follows this outward movement, whereby the diaphragm drops to the preselected setting and remains in this position until completion of the winding of the shutter and of the film feed. During the tensioning the eccentric 69 moves the lever 64c bearing against it and causes it thereby to engage the upper arm of lever 62c and to return to the locking position. In this way the plunger 4 is pressed in again by the thrust bolt 63 and the diaphragm is returned to its initial position.

In the embodiment according to FIGS. 8 and 10, a locking member 11d is provided which has a catch nose on its lower arm adapted to engage the arm 10d of the control lever 62d. Upon release of the locking member 11d by the action of pin 61, the lever 62d is acted upon by a spring 71d, so that the plunger 4 is pushed in toward the objective, whereupon the diaphragm occupies the preselected setting. Its return to the initial position takes place by the return motion of the control lever 62d to its locking position, which is effected on tensioning the shutter and film feed by way of the eccentric 69 and lever 64b.

In all embodiments the bearing points for the essential operative parts, for instance, for levers 8, 8a, 8b, 8c, or 8d, 14, lever arm 55, levers 62c, or 62d, locking member 11, 11c or 11d, and cocking levers 64c or 64d are coincidingly arranged at their respective locations, and all other operational means of the camera, such as shutter gear, film feed and reflex mechanism remain likewise unchanged. This affords the advantage that the system can be adapted to the different kinds of lenses and diaphragms without changing the essential structural or operative parts.

We claim:

1. A single lens mirror reflex camera comprising a housing, having mounted therein an interchangeable lens mechanism, a focal plane shutter positioned to expose a film in said housing, a shutter winding mechanism connected to said shutter and a film transport mechanism; aperture control means positioned adjacent said lens mechanism for adjusting the lens aperture between a preselected taking opening and a maximum viewing opening, said aperture control means including a movable control ram extending inwardly into said housing, a release mechanism projecting through said housing so as to be actuable by an operator, a control lever pivotally mounted in said housing having a first arm biased toward and engageable with said release mechanism and a second arm engageable with said control ram, said control lever including means on said first arm for releasing said shutter mechanism upon actuation by said releasing means, said control lever being positioned to move said control ram when said release mechanism is actuated by an operator from said maximum opening to said preselected opening for said aperture control means before engaging said shutter mechanism so as to effect release of said shutter mechanism, locking means in engagement with said shutter mechanism to arrest said control lever and thereby said aperture control means in said preselected position during runoff of said shutter mechanism, said shutter mechanism including unlocking means to release said control lever after runoff of said shutter for movement toward said releasing means and to thereby allow said aperture control means to move into said maximum position.

2. A mirror reflex camera comprising a housing having mounted therein a focal plane shutter, a lens, a shutter winding mechanism operatively coupled to said shutter for setting the same, and a film transport coupled to and operable by said winding mechanism; a release member projecting through said housing, aperture control means adjacent said lens for adjusting the opening of said lens and being movable from a maximum aperture position to a predetermined narrower aperture position, a control lever biased against said release member for movement thereby, said control lever being engageable with said aperture control means for moving the same from said maximum to said predetermined position in response to movement of said release member, actuator means connected with said control lever and engageable with said shutter after said control lever has tripped said aperture control means into said predetermined position for releasing said shutter in response to movement of said release member, locking means mounted on said housing, a catch member movable with said control lever, said locking means being biased against said catch member and capable of holding said catch member and said control lever when the latter has been moved by said release means to said predetermined position, a disengaging mechanism connected to said shutter and positioned thereon for engaging said locking means when said shutter has run off, for disengaging said locking means from said catch member, means for biasing said control lever to said maximum position, whereby said control lever is, upon release by said locking means, returned to a position wherein said aperture control means are in said maximum position.

3. A mirror reflex camera as in claim 2, further comprising a slide member connected between said control lever and said aperture control means for regulating the latter in response to said control lever.

4. A mirror reflex camera as in claim 3, wherein said aperture control means includes a reciprocating plunger projecting into said housing in the path of said slide member in correspondence to said predetermined position, whereby said slide member axially moves said plunger in response to said release member to a retracted position in correspondence to said predetermined position of the aperture control means, and wherein said plunger projects further inwardly in correspondence to said maximum position.

5. A mirror reflex camera as in claim 4, wherein said control lever includes a slot and said actuator means includes a mover pin in engagement with said slot whereby said control lever is mounted so as to move when said release member is moved inwardly of said housing, and wherein said plunger extends inwardly of said housing to a lesser degree in correspondence to said maximum position of said aperture control means than in correspondence to said predetermined position.

6. A mirror reflex camera comprising a housing having mounted therein a shutter mechanism, means connected to said shutter mechanism for winding said shutter mechanism, release means for ultimately triggering the latter after said shutter mechanism has been wound for the purpose of exposing film in said camera, a lens and a diaphragm for said lens; aperture control means mounted adjacent said lens in said housing, said aperture control means including a reciprocable ram projecting into said housing and being biased into said housing toward a position corresponding to the maximum opening of said diaphragm, said ram being movable to decrease projection into said housing to a position corresponding to a predetermined position of said diaphragm, said release means including a release shaft projecting through said housing and operable by an operator and a release plate pivotally mounted in said housing and movable by said release shaft to a position in engagement with said shutter mechanism for triggering the same, a control lever pivotally mounted coaxially with said release plate and capable of biasing with one end said release plate toward an ineffective position wherein said release plate lies against said release shaft, said control lever having a plunger mounted upon its other end for engagement with said ram, resilient means for biasing said plunger in the direction of said ram and for absorbing forces of said ram when said ram has been urged by movement of said control arm to said predetermined position, said control lever being pivotally movable by said release shaft and said release plate against the urging of resilient means biasing said lever against the release plate to a position whereby said ram is urged inwardly by said plunger, the movement of said control lever being capable of moving said ram so as to close said diaphragm before movement of said release plate triggers said shutter mechanism, a catch arm secured to said control lever, locking means biased against said catch arm and capable of locking said catch arm when said control lever is moved so as to close said diaphragm to said predetermined position, and means on said shutter mechanism engageable with said locking means when said shutter mechanism is about to run down for releasing said catch arm and said control arm so as to allow movement of said aperture control means to said maximum position.

7. In a mirror reflex camera having a housing, a lens in said housing, lens aperture control means in said housing adjacent said lens, a shutter mechanism in said housing, a winding mechanism for said shutter mechanism, a plunger biased to extend into said housing from said aperture control means, said plunger when biased into said housing corresponding to the maximum open condition of said aperture control means, said aperture control means being capable of being moved to a predetermined intermediate position by movement of said plunger to a position which is retracted from its extension into said housing, release means for said shutter mechanism in said housing, said release means including a shaft projecting through said housing for operation by an operator, an aperture control lever pivotally mounted in said housing and biased so as to urge said plunger toward the said predetermined intermediate position, said control lever being in engagement with said release means and movable thereby, locking means biased against the same for arresting said control lever in a position wherein said plunger completely extends into said housing so as to correspond to said maximum open position, said release means including a pin engageable with said shutter mechanism for releasing the same and capable of movement with said release means for freeing said locking means and allowing movement of said control lever so as to move said plunger toward a position corresponding to said predetermined intermediate position, whereby as said release means move toward engagement with said shutter mechanism said aperture control means is closed down to said predetermined position prior to the release of said shutter mechanism, and means connected to said winding mechanism for returning said control lever to a receiving position which allows return movement of said plunger into said housing so as to open said aperture control means to said maximum position in response to winding of said shutter, said returning means including a pivotally mounted V-shaped member engageable with said control lever, biasing means for moving said V- shaped member so as to pivot said control lever to the position corresponding to said maximum position, and eccentric means on said winding mechanism for moving said V-shaped member against urging of said biasing means.

8. In a camera as set forth in claim 7, a thrust bolt connected to an arm of said control lever associated with said plunger, resilient means surrounding the latter and biasing said bolt away from said arm toward said plunger, whereby said plunger is in contact with said thrust bolt and said thrust bolt limits the force upon said plunger so as to not move said plunger past said predetermined position.

References Cited in the file of this patent

UNITED STATES PATENTS

| | | |
|---|---|---|
| 2,273,386 | Steiner | Feb. 17, 1942 |
| 2,356,880 | Pigone | Aug. 29, 1944 |
| 2,371,524 | Kals | Mar. 13, 1945 |
| 2,504,011 | Dunlap | Apr. 11, 1950 |
| 2,652,756 | Willcox | Sept. 22, 1953 |
| 2,730,025 | Faulhaber | Jan. 10, 1956 |

UNITED STATES PATENT OFFICE
CERTIFICATE OF CORRECTION

Patent No. 3,052,170                          September 4, 1962

Siegfried Böhm et al.

It is hereby certified that error appears in the above numbered patent requiring correction and that the said Letters Patent should read as corrected below.

Column 8, lines 54 and 55, for "the same for arresting said control lever" read -- said control lever for arresting the same --; column 9, lines 8 and 9, for "the latter and biasing said bolt" read -- said thrust bolt and biasing the latter --.

Signed and sealed this 26th day of March 1963.

(SEAL)
Attest:
ESTON G. JOHNSON

Attesting Officer

DAVID L. LADD

Commissioner of Patents